United States Patent [19]
Rothman et al.

[11] Patent Number: 4,730,985
[45] Date of Patent: Mar. 15, 1988

[54] PROP-FAN WITH IMPROVED STABILITY

[75] Inventors: Edward A. Rothman, Glastonbury; John A. Violette, Granby, both of Conn.

[73] Assignee: United Technologies Corporation, Hartford, Conn.

[21] Appl. No.: 892,882

[22] Filed: Jul. 28, 1986

Related U.S. Application Data

[63] Continuation of Ser. No. 699,119, Feb. 7, 1985, abandoned.

[51] Int. Cl.⁴ .............................................. B64C 11/18
[52] U.S. Cl. ................................. 416/228; 416/223 R
[58] Field of Search ............... 416/223 R, 223 A, 228, 416/238; 415/119, 181

[56] References Cited

U.S. PATENT DOCUMENTS

| | | | |
|---|---|---|---|
| 1,506,937 | 9/1924 | Miller | 416/223 |
| 1,825,114 | 9/1931 | Hendrickson | 416/223 |
| 2,104,306 | 1/1938 | McLeod | 416/228 |
| 2,160,467 | 5/1939 | Ward | 416/228 |
| 2,714,499 | 8/1955 | Warner | 416/228 |
| 4,171,183 | 10/1979 | Cornell et al. | 416/223 |
| 4,358,246 | 11/1982 | Hanson et al. | 415/119 |
| 4,370,097 | 1/1983 | Hanson et al. | 415/119 |

Primary Examiner—Robert E. Garrett
Assistant Examiner—John T. Kwon
Attorney, Agent, or Firm—John Swiatocha

[57] ABSTRACT

Improved prop-fan stability is achieved by providing each blade of the prop-fan with a leading edge which, outwardly, from a location thereon at the mid-span of the blade, occupy generally a single plane.

6 Claims, 31 Drawing Figures

STA 11.10

STA 13.50

STA 15.50

STA 18.50

STA 21.50

STA 24.50

STA 27.00

STA 29.00

STA 32.00

STA 35.00

STA 38.00

STA 41.00

STA 43.50

STA 46.00

STA 47.50

STA 49.00

STA 50.50

STA 52.00

STA 53.00

STA 54.00

PROP-FAN WITH IMPROVED STABILITY

CROSS REFERENCE

The invention described herein was made in the performance of work under NASA Contract No. NA3-22394 and is subject to the provisions of Section 305 of the National Aeronautics and Space Act of 1958 (72 Stat. 435; 42 U.S.C. 2457).

This application is a continuation of application Ser. No. 699,119, filed Feb. 7, 1985 and now abandoned.

DESCRIPTION

1. Technical Field

This invention relates generally to aircraft propellers and more specifically to high speed prop-fans.

2. Background Art

It has been long known that certain aircraft such as commercial airliners may be powered more efficiently with turbo-props than turbo-jets. However, in the 1950s, turbo-jet powered aircraft began replacing propeller driven aircraft on relatively long routes because of the low cost and availability of jet fuel and the relatively low noise and vibration levels of turbo-jet power plants. The extreme increase in the cost of jet fuel in the 1970s caused the airline industry to look to a new generation of propeller as a way of enhancing the efficiency of operation of commercial airliners on routes of from 500–1800 miles and at speeds in the range of Mach 0.7–0.8. Since engines capable of powering such aircraft rotated at much higher rates of speed than state of the art turbo-prop engines, the propeller tips of which were already running at sonic speeds, the diameter of the new generation propeller had to be reduced. Since power handling requirements were greatly increased over state of the art turbo-props, high solidity ratios (greater than 1.0) at the propeller root were required and, therefore, the new generation propeller required a relatively large number of wide chord blades. To reduce compressibility losses and thereby make up for additional swirl losses, the blades of the new generation propeller were required to be thinner than existing blades. Blade sweep was also required to reduce the effective Mach number at the blade tip to less than critical while minimizing blade noise levels. The resulting highly loaded, high solidity, multi-bladed swept propeller is referred to today as a prop-fan and is disclosed in U.S. Pat. No. 4,171,183 and *American Institute of Aeronautics and Astronautics* Paper No. 75-1208. Improvements to such prop-fans are disclosed in U.S. Pat. Nos. 4,358,246 and 4,370,097 to Hanson, et al.

Those skilled in the art of aerodynamics recognize flutter as a potential problem in the operation of an aerodynamic device such as an airplane wing or propeller blade. In the low speed operation of a propeller blade, the blade may vibrate in uncoupled flat-wise bending and torsional modes, such vibrations being damped by the propeller itself and the aerodynamic loading thereon. However, at higher speeds, the flat-wise bending and torsional modes may become coupled, thus extracting greater energy from the airstream than when uncoupled. Such increased energy extraction can result in sustained, neutrally stable vibration or, in the case of classical flutter, in energy extraction exceeding that dissipated by internal blade damping, thereby causing a vibration of increasing amplitude and ultimately structural failure of the blade.

While classical flutter is always a consideration in the design and development of conventional propellers, it is of particular concern in prop-fans since the sweep of prop-fan blades increases the tendency toward coupling of flat-wise bending at the blade tip and torsional modes of vibration, thereby increasing the risk of classical flutter at high operating speeds. Moreover individual modes of vibration may be characterized by a combination of both bending and torsion motion which can result in single-mode, high-speed, unstalled flutter.

DISCLOSURE OF INVENTION

It is therefore among the objects of the present invention to provide an improved prop-fan characterized by reduced coupling between flat-wise bending and torsional vibratory motion, both for separate modes which tend to couple, and individual modes which contain components of both bending and torsional motion.

It is another object of the present invention to provide such a prop-fan wherein such reduced coupling is achieved by a stiffening of the prop-fan blades in an edge-wise direction.

These objects are achieved in the present invention by providing each swept prop-fan blade with a leading edge which, from a location outwardly of the midpoint thereof, occupies substantially a single plane, thereby enhancing the edge-wise stiffness of the blade and reducing the tendency of the coupling of flat-wise bending and torsional modes of blades vibration. In other words, the outer portion of the leading edge is curved in a chordal direction (to define blade sweep), the edge exhibiting no significant offset (lateral curvature in a span-wise direction. In the preferred embodiment, the leading edge of the tip portion of the blade is statically predeflected normally to the local chord line in the general direction of blade rotation. Under operating conditions, aerodynamic forces on the blade tend to straighten this predeflected tip portion whereby the entire leading edge outwardly from the mid-span of the blade occupies essentially a common plane under normal operating conditions.

BEST MODE FOR CARRYING OUT THE INVENTION

Figure 1:
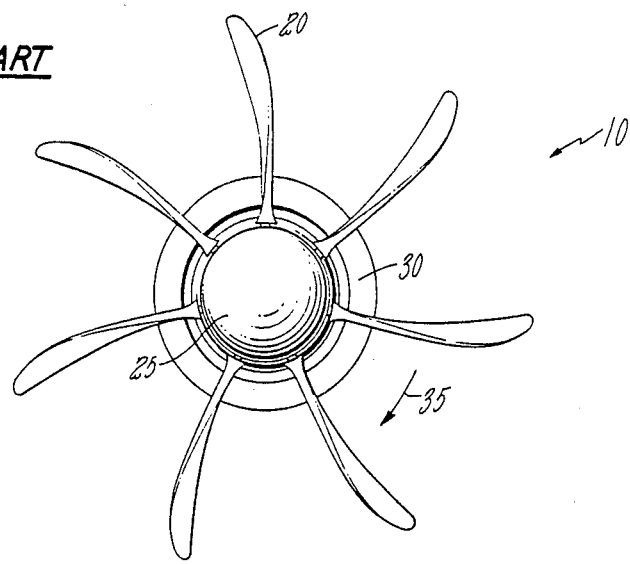
FIG. 1 is a frontal elevation of a prior art aircraft prop-fan.
Figure 2:
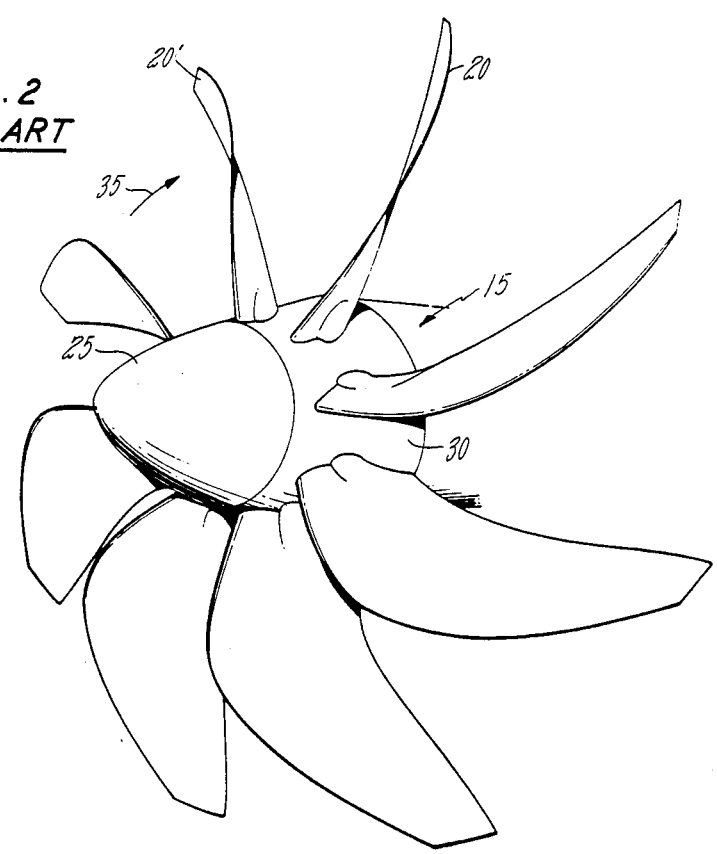
FIG. 2 is an isometric view of the prop-fan of FIG. 1.

Referring to FIGS. 1 and 2, a prior art prop-fan is shown generally at 10 and comprises a hub 15 on which a plurality of blades 20 are mounted for pivotal pitch change movement with respect thereto. The hub is covered by a spinner 25 and nacelle 30 which are shaped to reduce the effective velocity of the airflow adjacent to the spinner and nacelle so as to maintain an effective velocity through the inner airfoil sections of the blades equal to or less than the critical Mach number. Further details of the shape and structure of prop-fan 10 may be found in U.S. Pat. Nos. 4,171,183, 4,358,246 and 4,370,097 as well as *American Institute of Aeronautics and Astronautics* Paper No. 75-1208 noted hereinabove.

As perhaps best seen by reference to blade 20' shown in the 11 o'clock position in FIG. 2, each blade includes a leading edge which is swept back (for the reasons set forth hereinabove) and also curved in a circumferential direction generally opposite to the direction of rotation (indicated by arrows 35) of the propeller. This is in keeping with the aero-acoustic desire to sweep each of the high-speed outboard sections in a rearward direction, parallel to the local direction of air flow which describes a different helical path at each radial section. It has been shown that flat-wise vibration of the tip portions of blades 20 can result in a coupled torsional vibration thereof under certain operating conditions. Referring to blade 20' it will be appreciated that displacement of the blade tips normal to the local chord lines thereof will, owing to the blade sweep and curvature of the leading edge in a direction opposite that of rotation, contribute toward a twisting of the blade generally about the mass centers of the airfoils which define the blade. Thus, it is seen that flat-wise vibration can, under certain operating conditions, couple with a torsional vibration of the blade, thereby risking classical flutter and mechanical failure of the blade.

Figure 3:
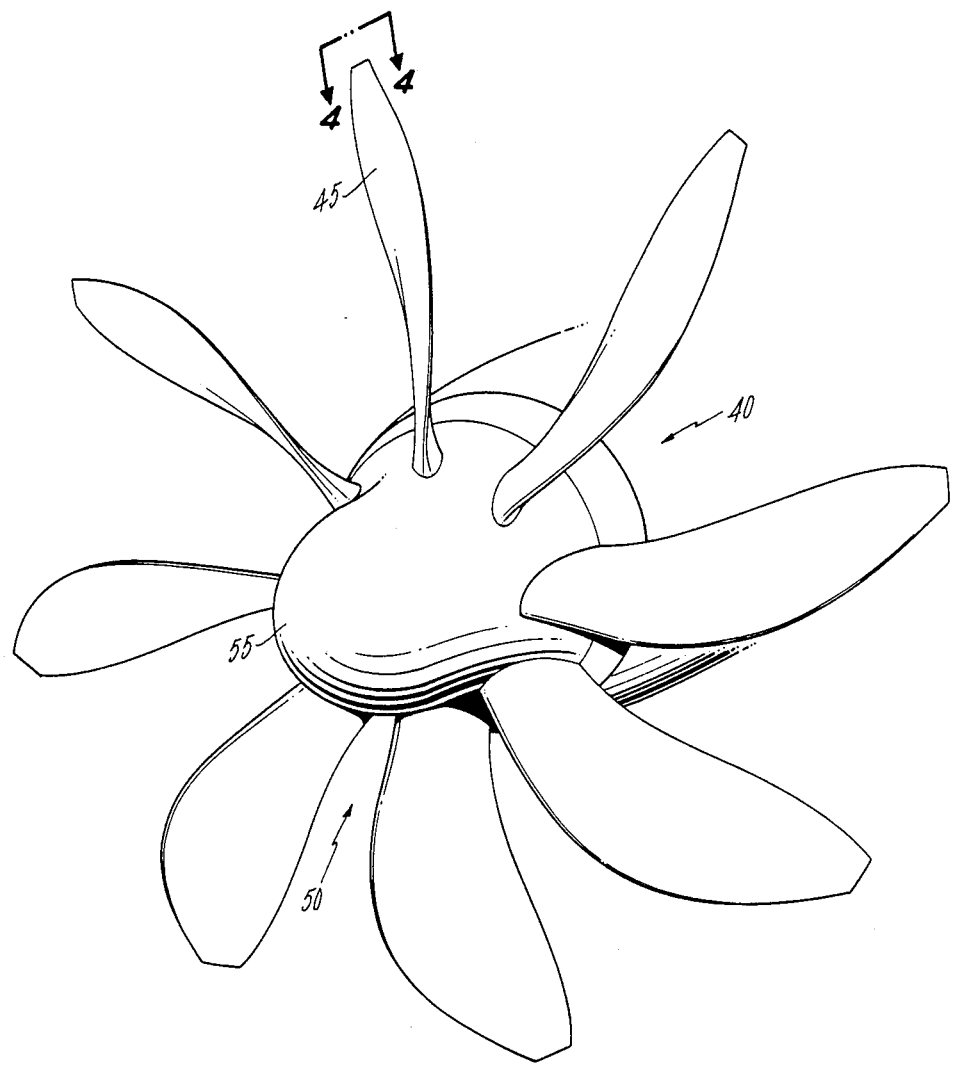
FIG. 3 is an isometric view of a prop-fan of the present invention.
Figure 4:
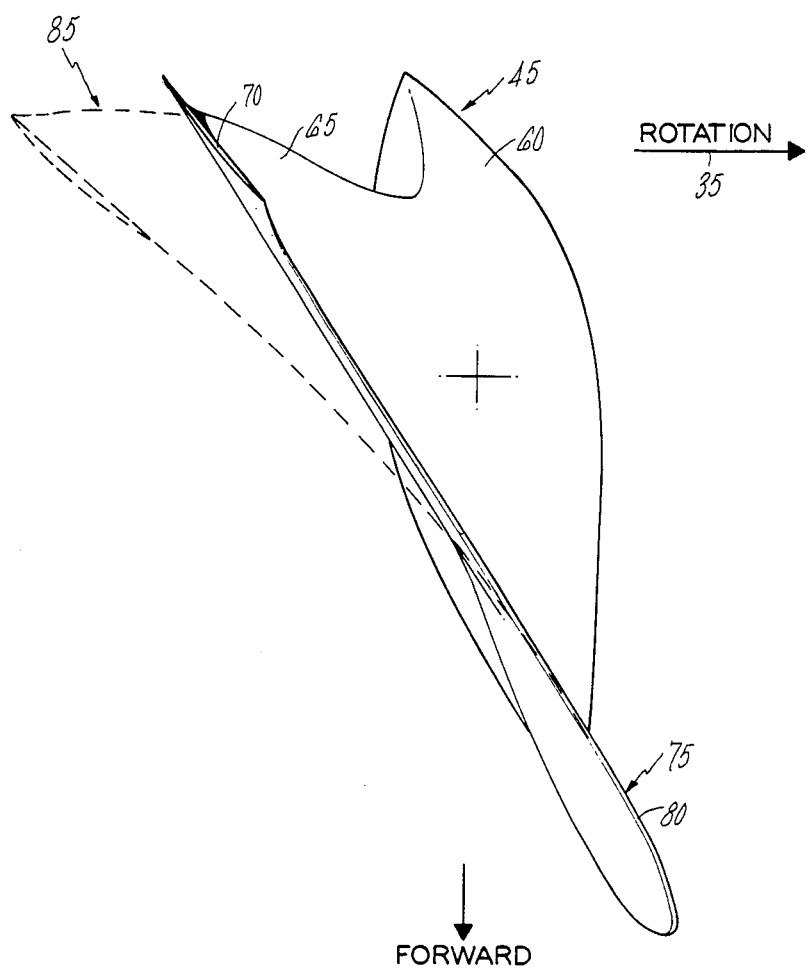
FIG. 4 is a plan view of one of the blades of the prop-fan of FIG. 3 taken in the direction of line 4—4 thereon.
Figure 5:
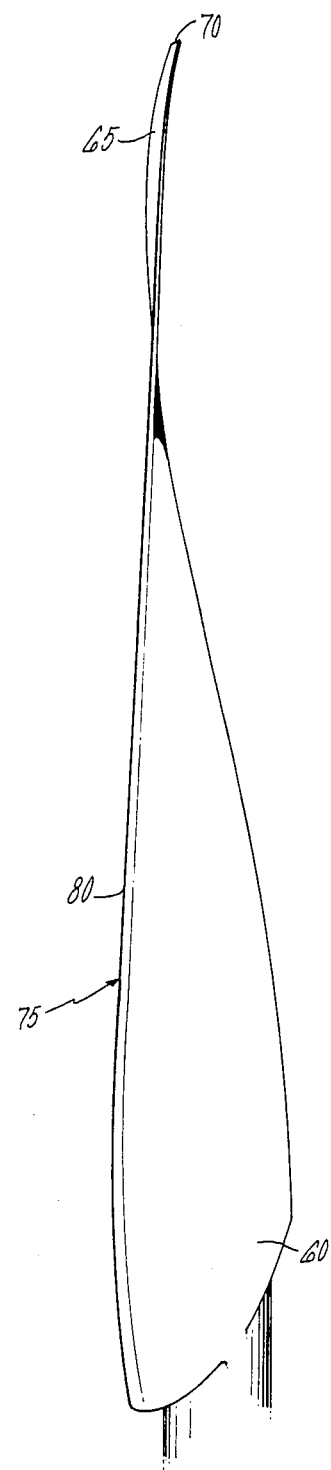
FIG. 5 is a frontal elevation of one of the blades of FIG. 3.

In accordance with the present invention, the tendency toward coupling of flat-wise bending and torsional modes of blade vibration is significantly reduced by a modification of the stacking of the airfoil sections which form the blades of the prop-fan. Referring to FIG. 3, the prop-fan of the present invention is shown generally at 40, comprising a plurality of blades 45 mounted on a hub 50 for pivotal, pitch change movement with respect thereto, hub 50 being covered by a spinner 55. As illustrated in FIG. 3, blades 45 are, at radially outer portions thereof, generally thin and swept back as are known prop-fan blades. The blades are also highly loaded and cummulatively define a solidity factor of greater than 1.0 at the roots thereof and less than 1.0 at the tips thereof, also in accordance with known prop-fan teachings. However, unlike prop-fan blades 20 illustrated in FIGS. 1 and 2, the airfoils which form blades 45 are stacked such that for each blade, the outer portion of the leading edge lies substantially in a single plane. In other words, the outer portion of the leading edge is curved only in a chordal direction, thereby defining blade sweep, without being significantly curved or offset in a span-wise direction (normal to the direction of blade sweep). This is perhaps best illustrated in the enlargements of one of the blades in FIGS. 4 and 5. Referring to these drawings, blade 45 includes a relatively thick base or root portion 60 which fairs radially outwardly to a thin tip portion 65 including a free tip 70. The leading edge of the blade is illustrated at 75, the mid point of the leading edge (located at about the mid point of the blade span) being shown at 80. As set forth hereinabove, it will be noted that that portion of leading edge 75 between point 80 and tip 70 lies substantially in a single plane. This is to be contrasted with prior art prop-fan blades (the radially outer portion thereof being shown in FIG. 4 by phantom line 85) wherein the leading edge of the blade curves in a direction generally opposite to the direction of blade rotation (illustrated again by arrow 35). However, it will be noted that the leading edge of the tip portion of blade 45 may be slightly statically predeflected in a direction generally normal to the local chord lines at the tip. The magnitude of the predeflection of the blade tip 70 is generally on the order of from 1.0% to 5.0% of the blade span and allows the bending of the blade tip portion by aerodynamic forces on the blade to maintain the tip portion of the blade leading edge in a coplanar relationship to the remainder of the outer portion of the leading edge.

Figure 6:
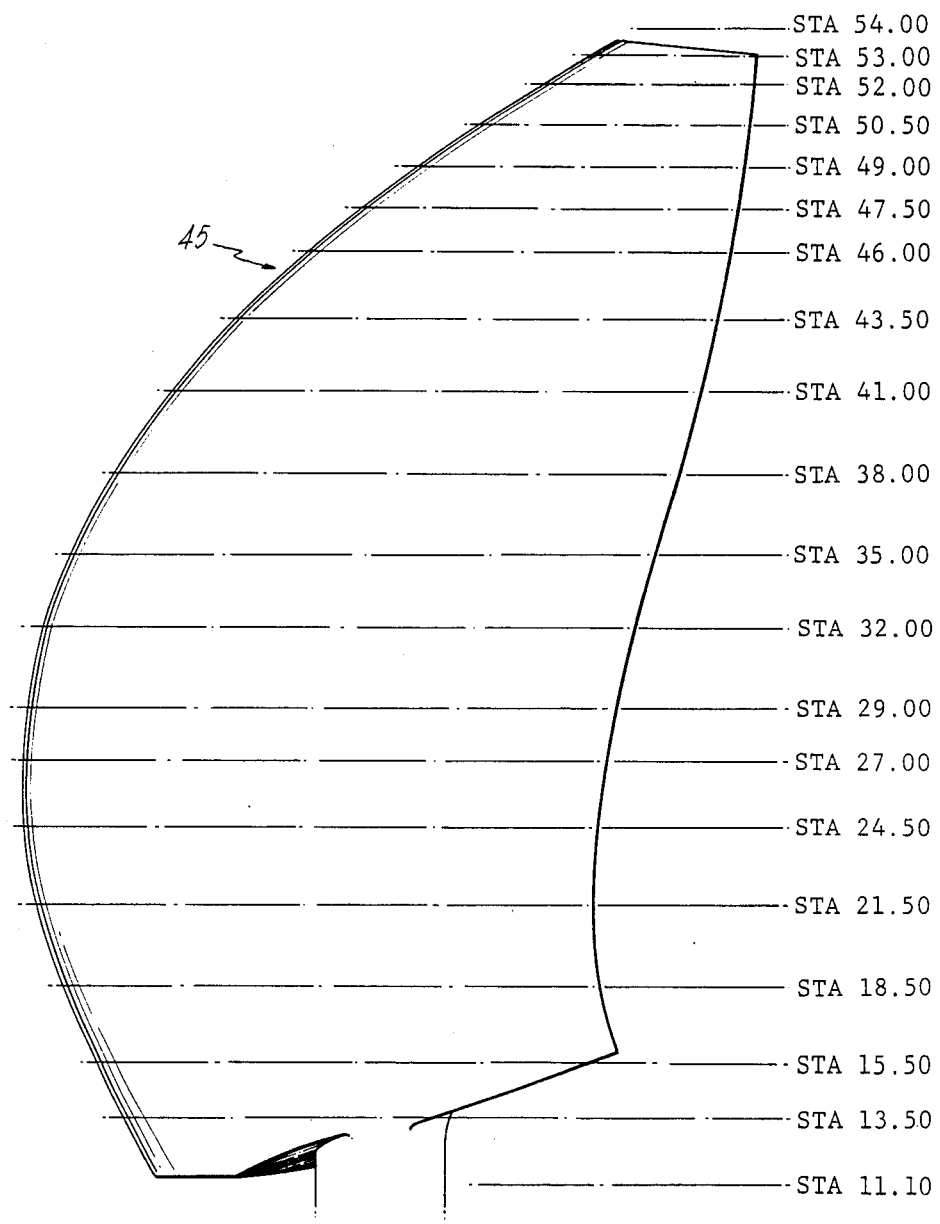
FIG. 6 is a side elevation of the blade of FIG. 5.
Figure 7:
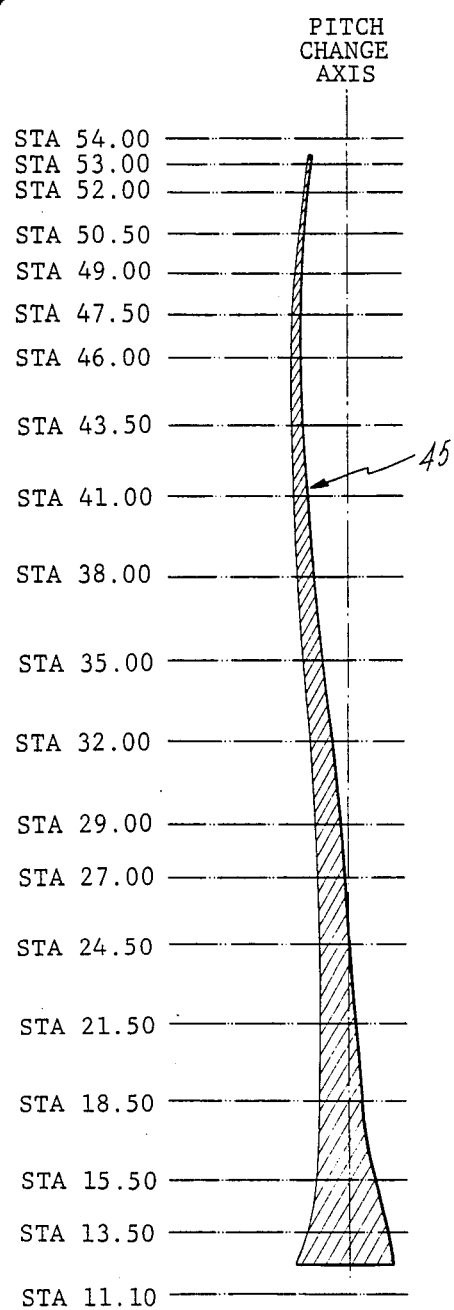
FIG. 7 is a sectional view taken at the chordal centers of the airfoil sections which define the blade of FIG. 6, in a direction perpendicular to the chords of those airfoils as exemplified by line 7—7 of FIG. 8.
Figure 8:
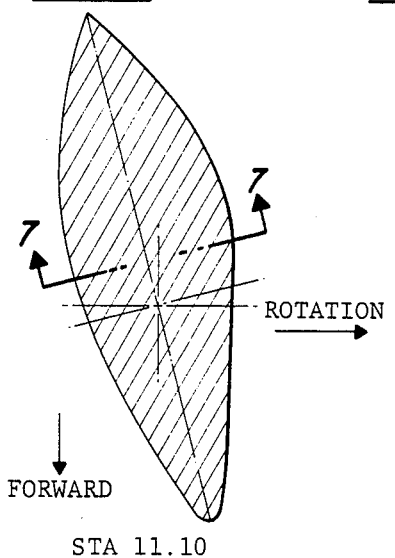
FIGS. 8–27 are a series of cross-sectional views of the airfoil sections which when stacked, define the blades of the prop-fan of the present invention, the sections being taken at the stations indicated in FIG. 6.
Figure 9:
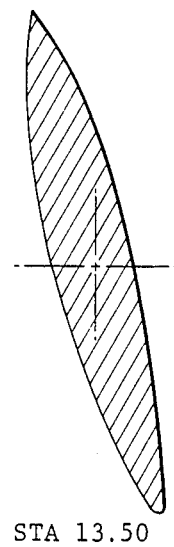
Figure 10:
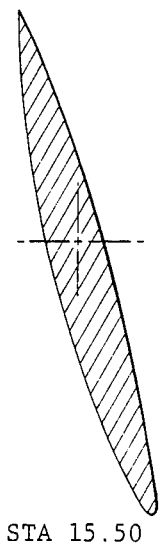
Figure 11:
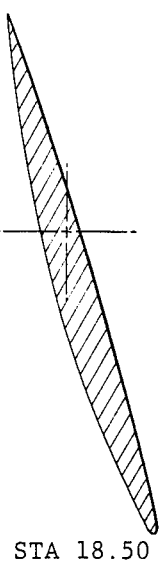

Referring to FIG. 6, a side elevation of blade 45 with twist removed therefrom is shown along with the locations of several stations along the blade span. The numbers of the stations indicate distances in inches from the radially innermost end of the blade spar outwardly, to the tip of the blade. Accordingly, it will be understood that the blade illustrated in FIG. 6 measures approximately 54 inches from tip to spar end.

Figure 12:
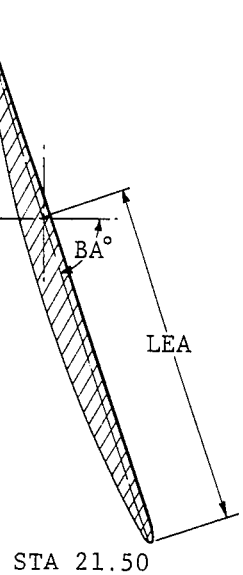
Figure 13:
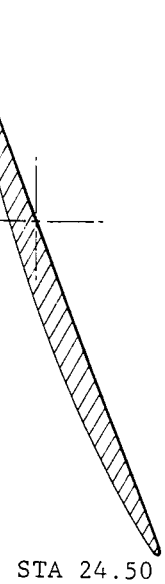
Figure 14:
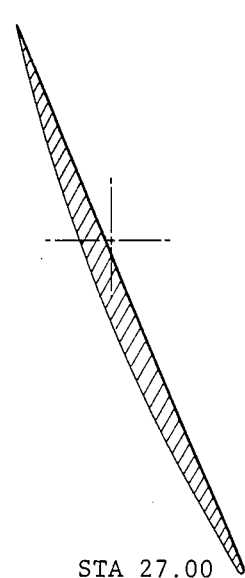
Figure 15:
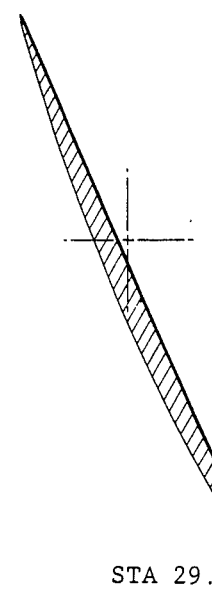
Figure 16:
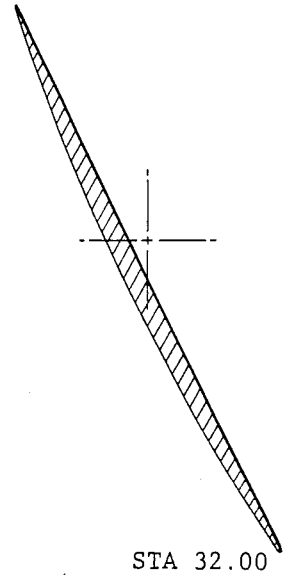
Figure 17:
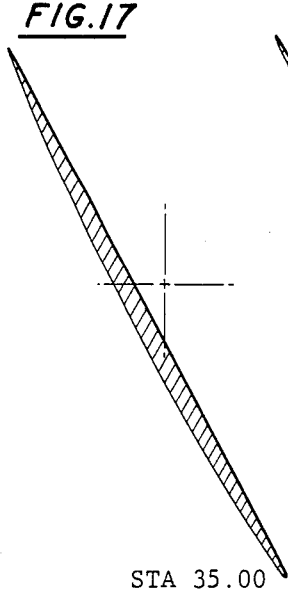
Figure 18:
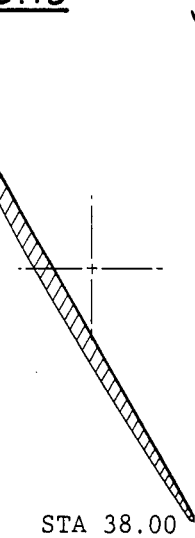
Figure 19:
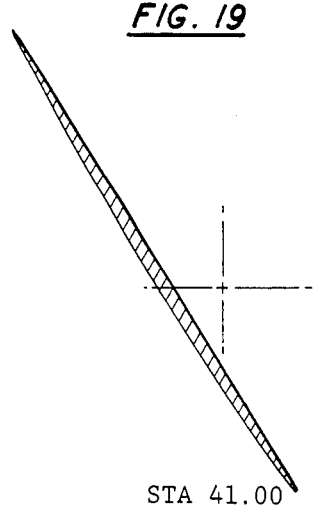
Figure 20:
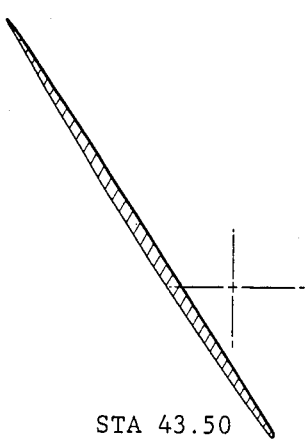
Figure 21:
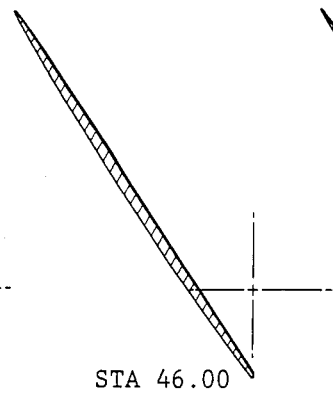
Figure 22:
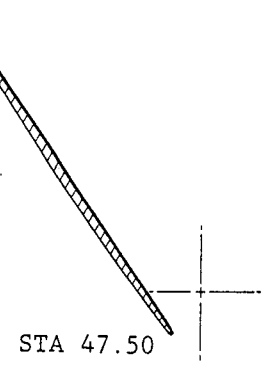
Figure 23:
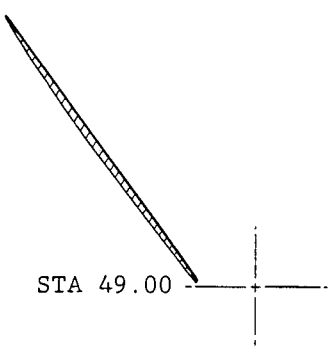
Figure 24:
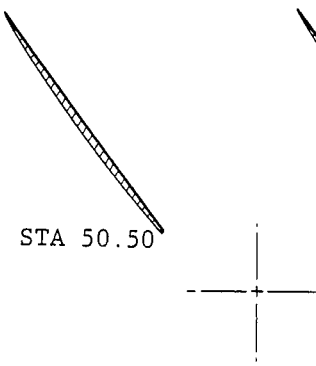
Figure 25:
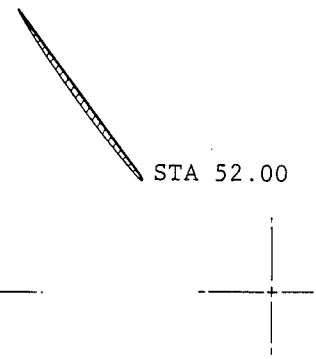
Figure 26:
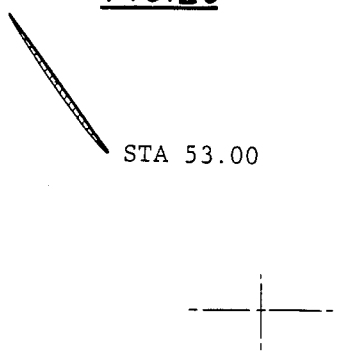
Figure 27:
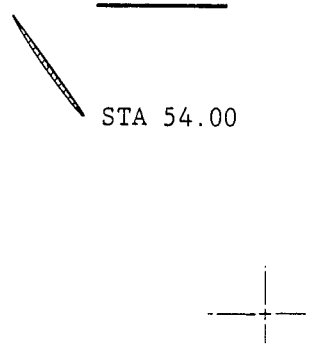

Referring to FIGS. 8-27, a family of airfoils resulting from the sectioning of blade 45 along lateral planes at the stations noted on FIG. 6 is shown. The intersection of the axes shown in each of FIGS. 8-27 define, the pitch change axis of the blade. The following tables list precise coordinates of the airfoil sections. For each table, angle BA is the angular orientation of the airfoil chord from a reference stacking plane, LEA is a measurement of the distance between the leading edge of the airfoil and the pitch change axis, Z is a chordal measure from the pitch change axis, C is the location of the camber side of the airfoil measured normally from a corresponding chordal location and F is the location of the face side of the airfoil measured normally from a corresponding chordal location. See FIG. 12.

TABLE I

| STA 11.10 | BA° 75.86 | LEA 8.199 | |
|---|---|---|---|
| Z | C | Z | F |
| −8.1302 | .1725 | −8.1273 | .2450 |
| −8.0714 | .2423 | −8.0714 | .3071 |
| −7.9539 | .3441 | −7.9539 | .4002 |
| −7.7580 | .4718 | −7.7580 | .5127 |
| −7.4152 | .6349 | −7.4152 | .6502 |
| −6.9255 | .8416 | −6.9255 | .8237 |
| −6.2399 | 1.1010 | −6.2399 | 1.0484 |
| −5.2604 | 1.4359 | −5.2604 | 1.3407 |
| −4.2810 | 1.7391 | −4.2810 | 1.6224 |
| −2.3221 | 2.2521 | −2.3221 | 2.1972 |
| −.3632 | 2.6288 | −.3632 | 2.7650 |
| 1.5957 | 2.8229 | 1.5957 | 3.2132 |
| 3.5545 | 2.7735 | 3.5545 | 3.3676 |
| 5.5134 | 2.4744 | 5.5134 | 3.1589 |
| 7.4723 | 1.9223 | 7.4723 | 2.5036 |
| 9.4312 | 1.1129 | 9.4312 | 1.4060 |
| 10.4106 | .5939 | 10.4106 | .7534 |

TABLE I-continued

STA 11.10  BA° 75.86  LEA 8.199

| Z | C | Z | F |
|---|---|---|---|
| 10.9003 | .2902 | 10.9003 | .4062 |
| 11.1942 | .0996 | 11.1942 | .1927 |
| 11.3814 | −.0219 | 11.3820 | .0544 |

TABLE II

STA 13.50  BA° 75.68  LEA 9.479

| Z | C | Z | F |
|---|---|---|---|
| −9.4249 | .0598 | −9.4227 | .1946 |
| −9.3528 | .1206 | −9.3528 | .2495 |
| −9.2362 | .1906 | −9.2362 | .3100 |
| −9.0418 | .2772 | −9.0418 | .3796 |
| −8.7017 | .3874 | −8.7017 | .4620 |
| −8.2157 | .5220 | −8.2157 | .5580 |
| −7.5354 | .6849 | −7.5354 | .6726 |
| −6.5635 | .8775 | −6.5635 | .8073 |
| −5.5915 | 1.0404 | −5.5915 | .9235 |
| −3.6477 | 1.3005 | −3.6477 | 1.1271 |
| −1.7039 | 1.4855 | −1.7039 | 1.3058 |
| .2399 | 1.5728 | .2399 | 1.4413 |
| 2.1838 | 1.5310 | 2.1838 | 1.4913 |
| 4.1276 | 1.3709 | 4.1276 | 1.4265 |
| 6.0714 | 1.0808 | 6.0714 | 1.1861 |
| 8.0152 | .6230 | 8.0152 | .7245 |
| 8.9871 | .3157 | 8.9871 | .4220 |
| 9.4731 | .1323 | 9.4731 | .2479 |
| 9.7647 | .0207 | 9.7647 | .1464 |
| 9.9462 | −.0483 | 9.9454 | .0860 |

TABLE III

STA 15.50  BA° 75.19  LEA 10.462

| Z | C | Z | F |
|---|---|---|---|
| −10.4138 | .0187 | −10.4096 | .1826 |
| −10.3355 | .0741 | −10.3355 | .2289 |
| −10.2186 | .1333 | −10.2186 | .2763 |
| −10.0237 | .2070 | −10.0237 | .3295 |
| −9.6827 | .3021 | −9.6827 | .3908 |
| −9.1954 | .4169 | −9.1954 | .4591 |
| −8.5133 | .5555 | −8.5133 | .5390 |
| −7.5389 | .7172 | −7.5389 | .6287 |
| −6.5645 | .8509 | −6.5645 | .7026 |
| −4.6156 | 1.0520 | −4.6156 | .8202 |
| −2.6667 | 1.1744 | −2.6667 | .9025 |
| −.7178 | 1.2067 | −.7178 | .9351 |
| 1.2311 | 1.1260 | 1.2311 | .8922 |
| 3.1799 | .9455 | 3.1799 | .7792 |
| 5.1288 | .6767 | 5.1288 | .6010 |
| 7.0777 | .3332 | 7.0777 | .3713 |
| 8.0521 | .1353 | 8.0521 | .2414 |
| 8.5394 | .0314 | 8.5394 | .1738 |
| 8.8317 | −.0310 | 8.8317 | .1333 |
| 9.0107 | −.0692 | 9.0093 | .1086 |

TABLE IV

STA 18.50  BA° 73.85  LEA 11.763

| Z | C | Z | F |
|---|---|---|---|
| −11.7222 | −.0339 | −11.7148 | .1889 |
| −11.6330 | .0197 | −11.6330 | .2270 |
| −11.5130 | .0717 | −11.5130 | .2615 |
| −11.3129 | .1376 | −11.3129 | .2981 |
| −10.9628 | .2249 | −10.9628 | .3369 |
| −10.4626 | .3309 | −10.4626 | .3765 |
| −9.7624 | .4586 | −9.7624 | .4204 |
| −8.7620 | .6076 | −8.7620 | .4650 |
| −7.7617 | .7292 | −7.7617 | .4991 |
| −5.7610 | .9056 | −5.7610 | .5504 |
| −3.7603 | 1.0058 | −3.7603 | .5801 |
| −1.7595 | 1.0239 | −1.7595 | .5802 |
| .2412 | .9443 | .2412 | .5351 |
| 2.2419 | .7777 | 2.2419 | .4513 |
| 4.2426 | .5370 | 4.2426 | .3416 |
| 6.2433 | .2381 | 6.2433 | .2242 |

TABLE IV-continued

STA 18.50  BA° 73.85  LEA 11.763

| Z | C | Z | F |
|---|---|---|---|
| 7.2436 | .0733 | 7.2436 | .1673 |
| 7.7438 | −.0081 | 7.7438 | .1465 |
| 8.0439 | −.0570 | 8.0439 | .1340 |
| 8.2272 | −.0868 | 8.2248 | .1265 |

TABLE V

STA 21.50  BA° 71.71  LEA 12.741

| Z | C | Z | F |
|---|---|---|---|
| −12.7039 | .0114 | −12.6951 | .1388 |
| −12.6058 | .0379 | −12.6058 | .1686 |
| −12.4813 | .0840 | −12.4813 | .1935 |
| −12.2739 | .1435 | −12.2739 | .2184 |
| −11.9108 | .2245 | −11.9108 | .2416 |
| −11.3921 | .3245 | −11.3921 | .2623 |
| −10.6659 | .4452 | −10.6659 | .2822 |
| −9.6286 | .5874 | −9.6286 | .2979 |
| −8.5912 | .7037 | −8.5912 | .3073 |
| −6.5164 | .8718 | −6.5164 | .3202 |
| −4.4417 | .9689 | −4.4417 | .3217 |
| −2.3670 | .9881 | −2.3670 | .3083 |
| −.2922 | .9162 | −.2922 | .2703 |
| 1.7825 | .7626 | 1.7825 | .2150 |
| 3.8573 | .5386 | 3.8573 | .1535 |
| 5.9320 | .2544 | 5.9320 | .1056 |
| 6.9694 | .1011 | 6.9694 | .0975 |
| 7.4881 | .0244 | 7.4881 | .0934 |
| 7.7993 | −.0216 | 7.7993 | .0910 |
| 7.9896 | −.0497 | 7.9867 | .0895 |

TABLE VI

STA 24.50  BA° 69.28  LEA 13.254

| Z | C | Z | F |
|---|---|---|---|
| −13.2141 | .1373 | −13.2047 | −.0166 |
| −13.1146 | .1769 | −13.1146 | .0026 |
| −12.9862 | .2165 | −12.9862 | .0196 |
| −12.7723 | .2695 | −12.7723 | .0365 |
| −12.3978 | .3432 | −12.3978 | .0512 |
| −11.8629 | .4340 | −11.8629 | .0632 |
| −11.1139 | .5422 | −11.1139 | .0716 |
| −10.0441 | .6690 | −10.0441 | .0752 |
| −8.9742 | .7720 | −8.9742 | .0757 |
| −6.8344 | .9202 | −6.8344 | .0758 |
| −4.6946 | 1.0093 | −4.6946 | .0666 |
| −2.5549 | 1.0309 | −2.5549 | .0489 |
| −.4151 | .9735 | −.4151 | .0182 |
| 1.7247 | .8425 | 1.7247 | −.0196 |
| 3.8644 | .6446 | 3.8644 | −.0561 |
| 6.0042 | .3868 | 6.0042 | −.0589 |
| 7.0741 | .2430 | 7.0741 | −.0603 |
| 7.6090 | .1710 | 7.6090 | −.0609 |
| 7.9300 | .1279 | 7.9300 | −.0614 |
| 8.1267 | .1014 | 8.1238 | −.0616 |

TABLE VII

STA 27.00  BA° 67.34  LEA 13.313

| Z | C | Z | F |
|---|---|---|---|
| −13.2704 | .3199 | −13.2587 | −.1989 |
| −13.1711 | .3520 | −13.1711 | −.1880 |
| −13.0403 | .3867 | −13.0403 | −.1767 |
| −12.8222 | .4352 | −12.8222 | −.1646 |
| −12.4407 | .5040 | −12.4407 | −.1542 |
| −11.8956 | .5876 | −11.8956 | −.1467 |
| −11.1324 | .6850 | −11.1324 | −.1436 |
| −10.0423 | .7971 | −10.0423 | −.1434 |
| −8.9521 | .8867 | −8.9521 | −.1437 |
| −6.7717 | 1.0122 | −6.7717 | −.1400 |
| −4.5913 | 1.0918 | −4.5913 | −.1466 |
| −2.4109 | 1.1159 | −2.4109 | −.1581 |
| −.2305 | 1.0754 | −.2305 | −.1762 |
| 1.9498 | .9699 | 1.9498 | −.2000 |
| 4.1302 | .7997 | 4.1302 | −.2268 |

TABLE VII-continued
STA 27.00  BA° 67.34  LEA 13.313

| Z | C | Z | F |
|---|---|---|---|
| 6.3106 | .5659 | 6.3106 | −.2485 |
| 7.4008 | .4260 | 7.4008 | −.2465 |
| 7.9459 | .3531 | 7.9459 | −.2455 |
| 8.2729 | .3105 | 8.2729 | −.2450 |
| 8.4735 | .2844 | 8.4709 | −.2446 |

TABLE VIII
STA 29.00  BA° 65.85  LEA 13.147

| Z | C | Z | F |
|---|---|---|---|
| −13.1043 | .4930 | −13.0911 | −.3741 |
| −13.0043 | .5212 | −13.0043 | −.3681 |
| −12.8721 | .5531 | −12.8721 | −.3606 |
| −12.6517 | .5991 | −12.6517 | −.3520 |
| −12.2661 | .6649 | −12.2661 | −.3446 |
| 11.7153 | .7431 | −11.7153 | −.3396 |
| −10.9440 | .8312 | −10.9440 | −.3377 |
| −9.8423 | .9305 | −9.8423 | −.3366 |
| −8.7406 | 1.0086 | 8.7406 | −.3346 |
| −6.5371 | 1.1166 | −6.5371 | −.3253 |
| −4.3336 | 1.1884 | −4.3336 | −.3269 |
| −2.1301 | 1.2138 | −2.1301 | −.3300 |
| .0733 | 1.1860 | .0733 | −.3352 |
| 2.2768 | 1.1008 | 2.2768 | −.3467 |
| 4.4803 | .9530 | 4.4803 | −.3673 |
| 6.6837 | .7357 | 6.6837 | −.3948 |
| 7.7855 | .5987 | 7.7855 | −.4102 |
| 8.3364 | .5234 | 8.3364 | −.4105 |
| 8.6669 | .4782 | 8.6669 | −.4106 |
| 8.8699 | .4505 | 8.8672 | −.4107 |

TABLE IX
STA 32.00  BA° 63.73  LEA 12.560

| Z | C | Z | F |
|---|---|---|---|
| −12.5203 | .7784 | −12.5072 | −.6718 |
| −12.4159 | .8052 | −12.4159 | −.6694 |
| −12.2828 | .8351 | −12.2828 | −.6655 |
| −12.0610 | .8788 | −12.0610 | −.6609 |
| −11.6728 | .9408 | −11.6728 | −.6582 |
| −11.1182 | 1.0119 | −11.1182 | −.6567 |
| −10.3418 | 1.0906 | −10.3418 | −.6582 |
| −9.2327 | 1.1782 | −9.2327 | −.6592 |
| −8.1236 | 1.2430 | −8.1236 | −.6552 |
| −5.9053 | 1.3279 | −5.9053 | −.6385 |
| −3.6870 | 1.3904 | −3.6870 | −.6376 |
| −1.4688 | 1.4132 | −1.4688 | −.6321 |
| .7495 | 1.3956 | .7495 | −.6252 |
| 2.9677 | 1.3301 | 2.9677 | −.6246 |
| 5.1860 | 1.2085 | 5.1860 | −.6388 |
| 7.4043 | 1.0166 | 7.4043 | −.6707 |
| 8.5134 | .8897 | 8.5134 | −.6939 |
| 9.0679 | .8139 | 9.0679 | −.6981 |
| 9.4007 | .7697 | 9.4007 | −.7007 |
| 9.6052 | .7420 | 9.6027 | −.7022 |

TABLE X
STA 35.00  BA° 61.65  LEA 11.521

| Z | C | Z | F |
|---|---|---|---|
| −11.4878 | 1.0954 | −11.4769 | −1.0064 |
| −11.3784 | 1.1239 | −11.3784 | −1.0044 |
| −11.2464 | 1.1512 | −11.2464 | −1.0019 |
| −11.0266 | 1.1923 | −11.0266 | −.9996 |
| −10.6419 | 1.2500 | −10.6419 | −1.0006 |
| −10.0922 | 1.3161 | −10.0922 | −1.0033 |
| −9.3228 | 1.3873 | −9.3228 | −1.0075 |
| −8.2235 | 1.4639 | −8.2235 | −1.0086 |
| −7.1242 | 1.5181 | −7.1242 | −1.0033 |
| −4.9257 | 1.5866 | −4.9257 | −.9855 |
| −2.7272 | 1.6400 | −2.7272 | −.9867 |
| −.5287 | 1.6552 | −.5287 | −.9810 |
| 1.6698 | 1.6350 | 1.6698 | −.9736 |
| 3.8683 | 1.5745 | 3.8683 | −.9720 |

TABLE X-continued
STA 35.00  BA° 61.65  LEA 11.521

| Z | C | Z | F |
|---|---|---|---|
| 6.0668 | 1.4675 | 6.0668 | −.9834 |
| 8.2653 | 1.3021 | 8.2653 | −1.0096 |
| 9.3645 | 1.1944 | 9.3645 | −1.0193 |
| 9.9142 | 1.1305 | 9.9142 | −1.0241 |
| 10.2439 | 1.0921 | 10.2439 | −1.0270 |
| 10.4461 | 1.0686 | 10.4439 | −1.0237 |

TABLE XI
STA 38.00  BA° 59.62  LEA 9.937

| Z | C | Z | F |
|---|---|---|---|
| −9.9089 | 1.4088 | −9.9015 | −1.3346 |
| −9.7990 | 1.4347 | −9.7990 | −1.3315 |
| −9.6713 | 1.4596 | 9.6713 | −1.3285 |
| −9.4584 | 1.4952 | −9.4584 | −1.3254 |
| −9.0859 | 1.5446 | −9.0859 | −1.3247 |
| −8.5538 | 1.6016 | −8.5538 | −1.3265 |
| −7.8088 | 1.6635 | −7.8088 | −1.3318 |
| −6.7446 | 1.7295 | −6.7446 | −1.3334 |
| −5.6803 | 1.7741 | −5.6803 | −1.3265 |
| −3.5518 | 1.8338 | −3.5518 | −1.3137 |
| −1.4232 | 1.8746 | −1.4232 | −1.3128 |
| .7053 | 1.8807 | .7053 | −1.3065 |
| 2.8338 | 1.8564 | 2.8338 | −1.3001 |
| 4.9624 | 1.7993 | 4.9624 | −1.2996 |
| 7.0909 | 1.7064 | 7.0909 | −1.3106 |
| 9.2194 | 1.5713 | 9.2194 | −1.3354 |
| 10.2837 | 1.4864 | 10.2837 | −1.3430 |
| 10.8158 | 1.4375 | 10.8158 | −1.3468 |
| 11.1351 | 1.4082 | 11.1351 | −1.3490 |
| 11.3298 | 1.3903 | 11.3281 | −1.3504 |

TABLE XII
STA 41.00  BA° 57.73  LEA 7.748

| Z | C | Z | F |
|---|---|---|---|
| −7.7225 | 1.6569 | −7.7167 | −1.5929 |
| −7.6183 | 1.6788 | −7.6183 | −1.5904 |
| −7.4987 | 1.6992 | −7.4987 | −1.5874 |
| −7.2993 | 1.7284 | −7.2993 | −1.5837 |
| −6.9503 | 1.7685 | −6.9503 | −1.5811 |
| −6.4519 | 1.8147 | −6.4519 | −1.5799 |
| −5.7540 | 1.8654 | −5.7540 | −1.5814 |
| −4.7570 | 1.9186 | −4.7570 | −1.5807 |
| −3.7601 | 1.9560 | −3.7601 | −1.5747 |
| −1.7661 | 2.0088 | −1.7661 | −1.5670 |
| .2278 | 2.0358 | .2278 | −1.5596 |
| 2.2217 | 2.0360 | 2.2217 | −1.5506 |
| 4.2156 | 2.0126 | 4.2156 | −1.5427 |
| 6.2095 | 1.9635 | 6.2095 | −1.5418 |
| 8.2035 | 1.8872 | 8.2035 | −1.5529 |
| 10.1974 | 1.7813 | 10.1974 | −1.5821 |
| 11.1943 | 1.7162 | 11.1943 | −1.5933 |
| 11.6928 | 1.6795 | 11.6928 | −1.5988 |
| 11.9919 | 1.6575 | 11.9919 | −1.6022 |
| 12.1727 | 1.6441 | 12.1715 | −1.6042 |

TABLE XIII
STA 43.50  BA° 56.42  LEA 5.431

| Z | C | Z | F |
|---|---|---|---|
| −5.4080 | 1.7746 | −5.4034 | −1.7182 |
| −5.3127 | 1.7922 | −5.3127 | −1.7168 |
| −5.2033 | 1.8089 | −5.2033 | −1.7139 |
| −5.0210 | 1.8329 | −5.0210 | −1.7102 |
| −4.7020 | 1.8661 | −4.7020 | −1.7073 |
| −4.2463 | 1.9051 | −4.2463 | −1.7055 |
| −3.6084 | 1.9493 | −3.6084 | −1.7068 |
| −2.6970 | 1.9972 | −2.6970 | −1.7081 |
| −1.7856 | 2.0261 | −1.7856 | −1.7013 |
| .0372 | 2.0719 | .0372 | −1.6956 |
| 1.8600 | 2.0921 | 1.8600 | −1.6867 |
| 3.6828 | 2.0917 | 3.6828 | −1.6780 |
| 5.5055 | 2.0714 | 5.5055 | −1.6708 |

TABLE XIII-continued

STA 43.50  BA° 56.42  LEA 5.431

| Z | C | Z | F |
|---|---|---|---|
| 7.3283 | 2.0303 | 7.3283 | −1.6700 |
| 9.1511 | 1.9669 | 9.1511 | −1.6804 |
| 10.9739 | 1.8782 | 10.9739 | −1.7068 |
| 11.8853 | 1.8244 | 11.8853 | −1.7165 |
| 12.3410 | 1.7945 | 12.3410 | −1.7213 |
| 12.6144 | 1.7765 | 12.6144 | −1.7241 |
| 12.7780 | 1.7658 | 12.7769 | −1.7258 |

TABLE XIV

STA 46.00  BA° 55.40  LEA 2.625

| Z | C | Z | F |
|---|---|---|---|
| −2.6052 | 1.8050 | −2.6009 | −1.7576 |
| −2.5215 | 1.8195 | −2.5215 | −1.7580 |
| −2.4260 | 1.8336 | −2.4260 | −1.7565 |
| −2.2667 | 1.8540 | −2.2667 | −1.7548 |
| −1.9880 | 1.8826 | −1.9880 | −1.7550 |
| −1.5899 | 1.9156 | −1.5899 | −1.7546 |
| −1.0325 | 1.9504 | −1.0325 | −1.7524 |
| −.2362 | 1.9882 | −.2362 | −1.7485 |
| .5601 | 2.0141 | .5601 | −1.7479 |
| 2.1527 | 2.0525 | 2.1527 | −1.7435 |
| 3.7453 | 2.0704 | 3.7453 | −1.7377 |
| 5.3379 | 2.0710 | 5.3379 | −1.7314 |
| 6.9304 | 2.0540 | 6.9304 | −1.7259 |
| 8.5230 | 2.0210 | 8.5230 | −1.7251 |
| 10.1156 | 1.9678 | 10.1156 | −1.7323 |
| 11.7082 | 1.8935 | 11.7082 | −1.7521 |
| 12.5045 | 1.8480 | 12.5045 | −1.7565 |
| 12.9026 | 1.8238 | 12.9026 | −1.7587 |
| 13.1415 | 1.8093 | 13.1415 | −1.7600 |
| 13.2820 | 1.8007 | 13.2809 | −1.7608 |

TABLE XV

STA 47.50  BA° 54.95  LEA .693

| Z | C | Z | F |
|---|---|---|---|
| −.6760 | 1.7855 | −.6725 | −1.7455 |
| −.5999 | 1.7990 | −.5999 | −1.7448 |
| −.5144 | 1.8116 | −.5144 | −1.7435 |
| −.3719 | 1.8291 | −.3719 | −1.7414 |
| −.1225 | 1.8535 | −.1225 | −1.7405 |
| .2338 | 1.8799 | .2338 | −1.7380 |
| .7327 | 1.9071 | .7327 | −1.7363 |
| 1.4453 | 1.9387 | 1.4453 | −1.7343 |
| 2.1579 | 1.9669 | 2.1579 | −1.7362 |
| 3.5831 | 2.0021 | 3.4831 | −1.7351 |
| 5.0084 | 2.0191 | 5.0084 | −1.7312 |
| 6.4336 | 2.0189 | 6.4336 | −1.7260 |
| 7.8588 | 2.0051 | 7.8588 | −1.7216 |
| 9.2841 | 1.9774 | 9.2841 | −1.7207 |
| 10.7093 | 1.9299 | 10.7093 | −1.7261 |
| 12.1345 | 1.8649 | 12.1345 | −1.7416 |
| 12.8472 | 1.8253 | 12.8472 | −1.7430 |
| 13.2035 | 1.8043 | 13.2035 | −1.7437 |
| 13.4172 | 1.7917 | 13.4172 | −1.7442 |
| 13.5409 | 1.7844 | 13.5393 | −1.7444 |

TABLE XVI

STA 49.00  BA° 54.62  LEA −1.430

| Z | C | Z | F |
|---|---|---|---|
| 1.4424 | 1.7294 | 1.4450 | −1.6981 |
| 1.5101 | 1.7423 | 1.5101 | −1.6963 |
| 1.5842 | 1.7535 | 1.5842 | −1.6967 |
| 1.7077 | 1.7684 | 1.7077 | −1.6952 |
| 1.9240 | 1.7885 | 1.9240 | −1.6950 |
| 2.2328 | 1.8109 | 2.2328 | −1.6938 |
| 2.6653 | 1.8383 | 2.6653 | −1.6965 |
| 3.2830 | 1.8665 | 3.2830 | −1.6963 |
| 3.9008 | 1.8904 | 3.9008 | −1.6967 |
| 5.1363 | 1.9192 | 5.1363 | −1.6954 |
| 6.3718 | 1.9338 | 6.3718 | −1.6918 |
| 7.6074 | 1.9315 | 7.6074 | −1.6868 |

TABLE XVI-continued

STA 49.00  BA° 54.62  LEA −1.430

| Z | C | Z | F |
|---|---|---|---|
| 8.8429 | 1.9209 | 8.8429 | −1.6826 |
| 10.0784 | 1.8984 | 10.0784 | −1.6819 |
| 11.3139 | 1.8576 | 11.3139 | −1.6859 |
| 12.5495 | 1.8023 | 12.5495 | −1.6901 |
| 13.1672 | 1.7677 | 13.1672 | −1.6922 |
| 13.4761 | 1.7504 | 13.4761 | −1.6933 |
| 13.6614 | 1.7401 | 13.6614 | −1.6939 |
| 13.7661 | 1.7342 | 13.7650 | −1.6943 |

TABLE XVII

STA 50.50  BA° 54.95  LEA −3.737

| Z | C | Z | F |
|---|---|---|---|
| 3.7475 | 1.6643 | 3.7493 | −1.6398 |
| 3.8039 | 1.6749 | 3.8039 | −1.6375 |
| 3.8653 | 1.6842 | 3.8653 | −1.6369 |
| 3.9676 | 1.6962 | 3.9676 | −1.6365 |
| 4.1466 | 1.7116 | 4.1466 | −1.6341 |
| 4.4023 | 1.7296 | 4.4023 | −1.6326 |
| 4.7603 | 1.7507 | 4.7603 | −1.6344 |
| 5.2718 | 1.7725 | 5.2718 | −1.6337 |
| 5.7832 | 1.7904 | 5.7832 | −1.6336 |
| 6.8060 | 1.8130 | 6.8060 | −1.6351 |
| 7.8289 | 1.8290 | 7.8289 | −1.6341 |
| 8.8518 | 1.8290 | 8.8518 | .6320 |
| 9.8746 | 1.8240 | 9.8746 | −1.6322 |
| 10.8975 | 1.8088 | 10.8975 | −1.6334 |
| 11.9203 | 1.7781 | 11.9203 | −1.6389 |
| 12.9432 | 1.7338 | 12.9432 | −1.6370 |
| 13.4546 | 1.7039 | 13.4546 | −1.6361 |
| 13.7103 | 1.6889 | 13.7103 | −1.6356 |
| 13.8638 | 1.6800 | 13.8638 | −1.6353 |
| 13.9472 | 1.6751 | 13.9460 | −1.6351 |

TABLE XVIII

STA 52.00  BA° 54.51  LEA −6.231

| Z | C | Z | F |
|---|---|---|---|
| 6.2398 | 1.5528 | 6.2412 | −1.5332 |
| 6.2827 | 1.5595 | 6.2827 | −1.5325 |
| 6.3300 | 1.5655 | 6.3300 | −1.5319 |
| 6.4089 | 1.5741 | 6.4089 | −1.5311 |
| 6.5470 | 1.5866 | 6.5470 | −1.5300 |
| 6.7442 | 1.6007 | 6.7442 | −1.5295 |
| 7.0202 | 1.6163 | 7.0202 | −1.5295 |
| 7.4146 | 1.6337 | 7.4146 | −1.5298 |
| 7.8090 | 1.6472 | 7.8090 | −1.5303 |
| 8.5978 | 1.6664 | 8.5978 | −1.5311 |
| 9.3866 | 1.6776 | 9.3866 | −1.5317 |
| 10.1754 | 1.6819 | 10.1754 | −1.5325 |
| 10.9642 | 1.6796 | 10.9642 | −1.5341 |
| 11.7530 | 1.6687 | 11.7530 | −1.5367 |
| 12.5418 | 1.6473 | 12.5418 | −1.5338 |
| 13.3306 | 1.6118 | 13.3306 | −1.5350 |
| 13.7250 | 1.5898 | 13.7250 | −1.5317 |
| 13.9222 | 1.5786 | 13.9222 | −1.5300 |
| 14.0406 | 1.5719 | 14.0406 | −1.5291 |
| 14.1002 | 1.5685 | 14.0989 | −1.5286 |

TABLE XIX

STA 53.00  BA° 54.32  LEA −7.987

| Z | C | Z | F |
|---|---|---|---|
| 7.9937 | 1.4426 | 7.9946 | −1.4263 |
| 8.0271 | 1.4474 | 8.0271 | −1.4257 |
| 8.0646 | 1.4518 | 8.0646 | −1.4250 |
| 8.1269 | 1.4580 | 8.1269 | −1.4241 |
| 8.2361 | 1.4671 | 8.2361 | −1.4229 |
| 8.3921 | 1.4774 | 8.3921 | −1.4220 |
| 8.6104 | 1.4887 | 8.6104 | −1.4213 |
| 8.9223 | 1.5015 | 8.9223 | −1.4208 |
| 9.2342 | 1.5117 | 9.2342 | −1.4208 |
| 9.8580 | 1.5267 | 9.8580 | −1.4214 |
| 10.4818 | 1.5355 | 10.4818 | −1.4218 |

TABLE XIX-continued

| STA 53.00 | BA° 54.32 | LEA −7.987 | |
|---|---|---|---|
| Z | C | Z | F |
| 11.1059 | 1.5394 | 11.1059 | −1.4229 |
| 11.7294 | 1.5379 | 11.7294 | −1.4222 |
| 12.3532 | 1.5287 | 12.3532 | −1.4226 |
| 12.9770 | 1.5111 | 12.9770 | −1.4233 |
| 13.6008 | 1.4820 | 13.6008 | −1.4184 |
| 13.9127 | 1.4661 | 13.9127 | −1.4150 |
| 14.0686 | 1.4584 | 14.0686 | −1.4136 |
| 14.1622 | 1.4538 | 14.1622 | −1.4128 |
| 14.2043 | 1.4518 | 14.2047 | −1.4125 |

TABLE XX

| STA 54.00 | BA° 54.04 | LEA 9.788 | |
|---|---|---|---|
| Z | C | Z | F |
| 9.7933 | 1.2873 | 9.7943 | −1.2756 |
| 9.8176 | 1.2915 | 9.8176 | −1.2754 |
| 9.8446 | 1.2955 | 9.8446 | −1.2752 |
| 9.8895 | 1.3014 | 9.8895 | −1.2750 |
| 9.9680 | 1.3101 | 9.9680 | −1.2748 |
| 10.0803 | 1.3201 | 10.0803 | −1.2752 |
| 10.2374 | 1.3306 | 10.2374 | −1.2758 |
| 10.4619 | 1.3406 | 10.4619 | −1.2767 |
| 10.6864 | 1.3460 | 10.6864 | −1.2774 |
| 11.1354 | 1.3524 | 11.1354 | −1.2786 |
| 11.5844 | 1.3610 | 11.5844 | −1.2806 |
| 12.0334 | 1.3657 | 12.0334 | −1.2830 |
| 12.4823 | 1.3673 | 12.4823 | −1.2864 |
| 12.9313 | 1.3630 | 12.9313 | −1.2802 |
| 13.3803 | 1.3505 | 12.3803 | −1.2740 |
| 13.8293 | 1.3296 | 13.8293 | −1.2677 |
| 14.0538 | 1.3161 | 14.0538 | −1.2646 |
| 14.1660 | 1.3085 | 14.1660 | −1.2631 |
| 14.2334 | 1.3037 | 14.2334 | −1.2621 |
| 14.2595 | 1.3018 | 14.2579 | −1.2618 |

Figure 28:
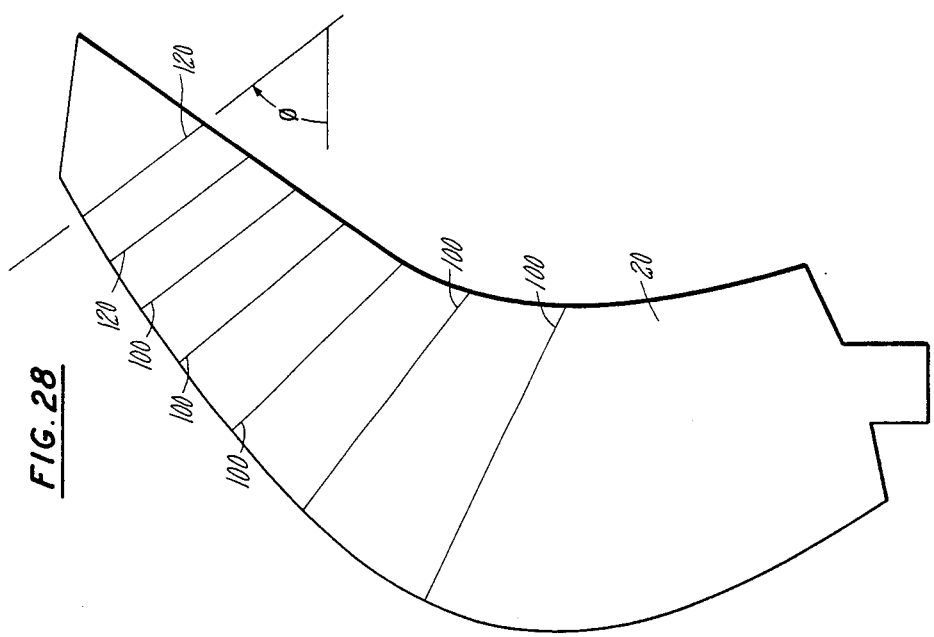
FIG. 28 is a side elevation of a prior art prop-fan blade in a graphical representation of a first resonance mode thereof.

The improvement in the vibration characteristics of the prop-fan of the present invention is illustrated in FIGS. 28-31. FIG. 28 illustrates the results of analytical vibration predictions, verified by test, of a prior art prop-fan blade. In this test, a two foot diameter, titanium prop-fan was rotated at 8636 rpm, lines 100 connecting points of equal vibratory motion on the leading and trailing edges of the blade at a first resonance point of 180 Hz. It is noted that at the tip, the angular displacement of lines 120 from the axis of rotation of the prop-fan is roughly indicative of the type of vibration experienced by the blade. A very small value of angle $\phi$ indicating substantially pure bending, while an angle $\phi$ of 90° indicating substantially pure torsion. Thus, it will be noted that the angle illustrated is indicative of substantial coupling between bending and torsional modes of vibration. This blade exhibited high-speed, unstalled flutter of the first mode illustrated in FIG. 28 during wind tunnel tests. A stability analysis was subsequently developed which successfully predicted the operating condition corresponding to the onset of the first mode, high-speed, unstalled flutter.

Figure 29:
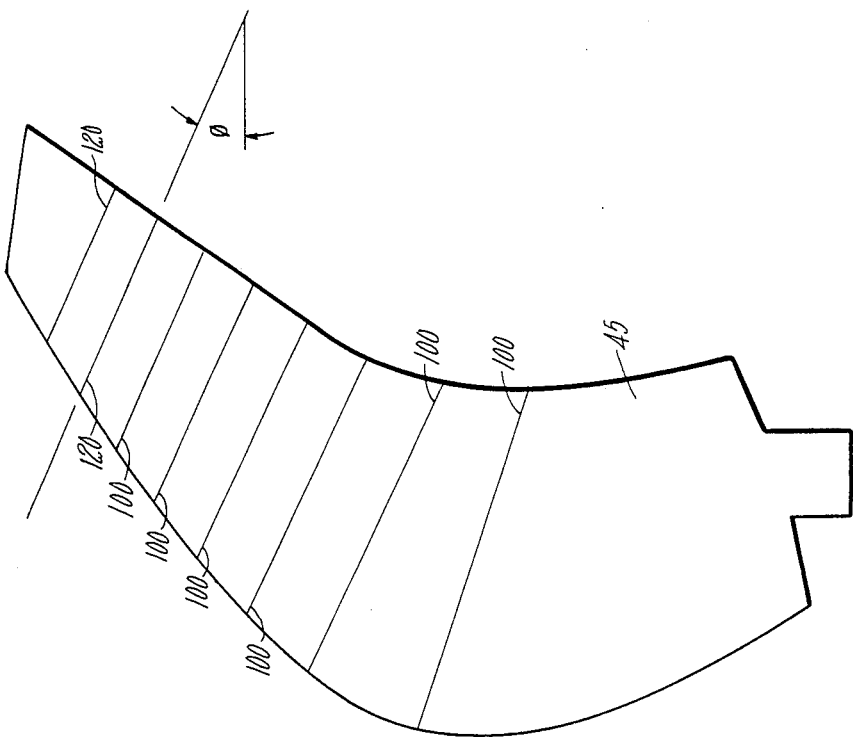
FIG. 29 is a view similar to FIG. 28 but illustrating the effects of the first resonance mode on one of the blades of the prop-fan of the present invention.

FIG. 29 illustrates the results of analytical vibration predictions of a blade of the present invention differing from the blade of FIG. 28 only in the restacking of the airfoil sections to define a leading edge orientation in a single plane. In this analysis a solid titanium, two foot diameter prop-fan was rotated at 8636 rpm and the mode shape at a 198 Hz first resonance point was predicted. Note that in FIG. 29, angle $\phi$ defined by lines connecting points of equal vibratory movement is substantially less than the corresponding angle in FIG. 28, indicating less coupling of flat-wise bending and torsional vibratory modes at the blade tip than experienced by the prior art blade of FIG. 28. In other words, the blade of the present invention illustrated in FIG. 29 experiences substantially less torsional vibration and hence less coupling between the modes of vibration than the prior art blade of FIG. 28, and thus improved high speed stability.

Figure 30:
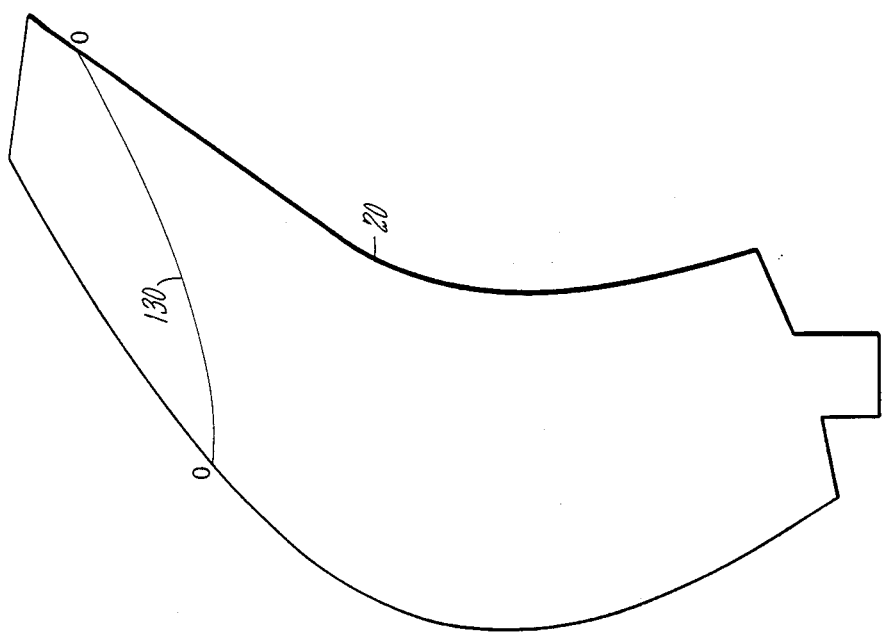
FIG. 30 is a view similar to FIG. 28 but showing the effects of a fourth resonance mode on the prior art prop-fan blade.

In FIG. 30, a node line 130 is shown for the prior art blade of FIG. 28 when experiencing a forth resonance point (710 Hz) at a rotational speed of 8636 rpm. Those skilled in the art will appreciate that a node line parallel to the blade spar indicates torsional vibration while a node line perpendicular to the blade spar indicates flat-wise bending vibration. Thus, node line illustrated in FIG. 30 being generally horizontal at the left end thereof and approaching a more vertical orientation at the right end thereof indicates coupling between torsional and bending in the circumferentially outer portion of the blade.

Figure 31:
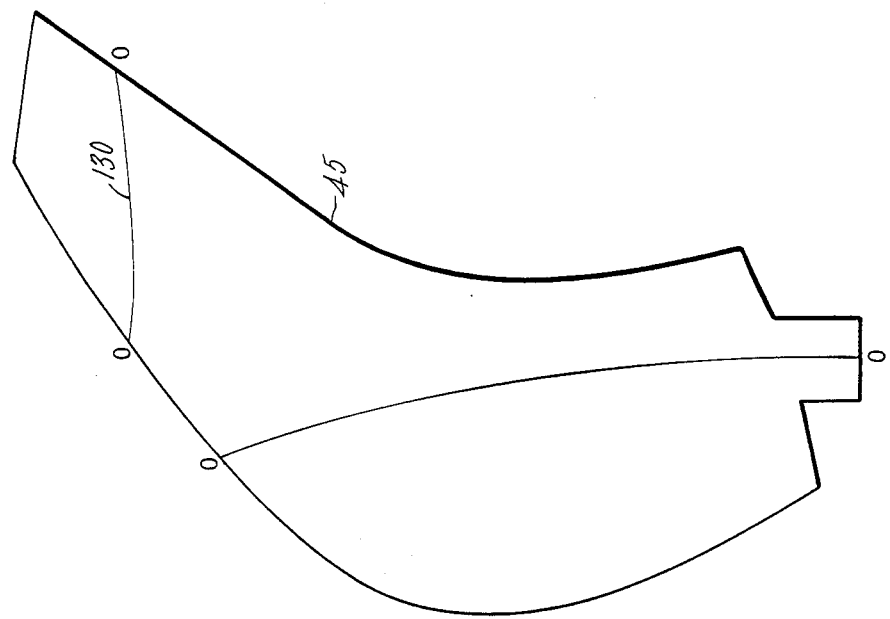
FIG. 31 is a view similar to FIG. 29 but illustrating the effects of the fourth resonance mode on the prop-fan blade of the present invention.

However, in FIG. 31 node lines 130 for the fourth resonance point (785 Hz) predicted by analysis for the blade of the present invention when rotated at 8636 rpm, indicate generally pure bending at the blade tip and generally pure torsion at the blade root further evidencing a general uncoupling of these modes of vibration and the enhanced high speed stability associated therewith.

The same high-speed stability analysis which successfully predicted the onset of first mode, high-speed unstalled flutter instability of the prior art blade of FIG. 28 was applied to the blade of the present invention illustrated in FIGS. 29 and 31. Results of that stability analysis indicate that the blade of the present invention has greatly improved high-speed stability.

It is thus apparent that the prop-fan of the present invention exhibits significantly less coupling between torsional and flat-wise bending modes of vibration, and thus less risk of classical flutter and improved stability over known prop-fan blade geometries. While the prop-fan of the present invention has been illustrated with eight blades, it will be appreciated that greater or lesser numbers of such blades may be employed without departing from this invention. Likewise, while a particular family of airfoils has been illustrated as defining blade geometry it will be understood that the invention herein may be practiced by the stacking of any suitable family of airfoils to achieve the generally planar orientation of the blade leading edge from the midpoint of the blade span to the blade tip. Accordingly, it is intended by the following claims to cover these and any other modifications which will be suggested to those skilled in the art by the disclosure herein.

Having thus described the invention, what is claimed is:

1. A prop-fan comprising a plurality of swept, rotatable airfoil blades pivotally mounted to a hub for pitch change movement with respect thereto, and having a solidity ratio of 1.0 or greater at the roots of said blades and less than 1.0 at the tips of said blades, said prop fan being operable at or above critical Mach numbers and at transonic or supersonic tip speeds, and being characterized by:

each of said blades having a leading edge, said leading edge, from a location thereon at approximately a midportion of the span and said blade, outwardly to the tip thereof, being curved in a chordal direction to define blade sweep while exhibiting no significant offset curvature in a span-wise direction.

2. The prop-fan of claim 1 characterized by said leading portions of those airfoil sections defining tip portions of each of said blade being slightly bent normal from the local chord lines thereof generally in the direction of rotation of said prop-fan under normal operating conditions.

3. The prop-fan of claim 2 characterized by each of said blades including a radially outermost tip, the leading edge of each of said tips being offset from said common plane, a distance approximately equal to between 1% and 5% of said blade span.

4. The pro-fan of claim 1 characterized by said leading edge at a tip portion of said blade being slightly statically predeflected normal to the local chord line in the direction of rotation of said prop-fan.

5. The prop-fan of claim 4 characterized by said static predeflection being sufficient to effect a straightening of said tip portion of said blade by the aerodynamic loading thereof under normal operating conditions.

6. A prop-fan comprising a plurality of swept, rotatable airfoil blades pivotally mounted to a hub for pitch change movement with respect thereto, and having a solidity ratio of 1.0 or greater at the roots of said blades and less than 1.0 at the tips of said blades, said prop-fan being operable at or above critical Mach numbers and at transonic or supersonic tip speeds, and being characterized by:

each of said rotatable blades, outwardly from approximately the midpoint of the span thereof, comprising a plurality of stacked airfoil sections defined substantially by the coordinate system of Tables VIII through XX set forth hereinabove.

* * * * *